United States Patent
Gläser et al.

[11] 3,891,536
[45] June 24, 1975

[54] SPUTTER-COATING APPARATUS

[75] Inventors: Hans-Joachim Gläser, Gelsenkirchen; Hans-Werner Brandt, Witten, both of Germany

[73] Assignee: Flachglas Aktiengesellschaft DELOG-DETAG, Auf der Rhine, Germany

[22] Filed: Oct. 9, 1973

[21] Appl. No.: 404,677

[30] Foreign Application Priority Data
Oct. 7, 1972 Germany............................ 2249297
Oct. 7, 1972 Germany............................ 7236940

[52] U.S. Cl................................ 204/298; 204/192
[51] Int. Cl............................................. C23c 15/00
[58] Field of Search......................... 204/192, 298

[56] References Cited
UNITED STATES PATENTS
3,414,503 12/1968 Brichard................... 204/298
3,738,928 6/1973 Gläser et al................ 204/298

*Primary Examiner*—Oscar R. Vertiz
*Assistant Examiner*—Wayne A. Langel
*Attorney, Agent, or Firm*—Karl F. Ross; Herbert Dubno

[57] ABSTRACT

A sputter-coating apparatus comprises an elongated chamber provided at its ends with loading doors and having internally upright supports each provided with a pair of vertically spaced guide rails on which vertical platelike workpieces are carried and guided. A carriage is horizontally displaceable above the workpieces and is provided with a plurality of suspended sputter-coating cathodes connected together as a plurality of racks whose lower ends are guided on rails on the workpiece supports.

4 Claims, 5 Drawing Figures

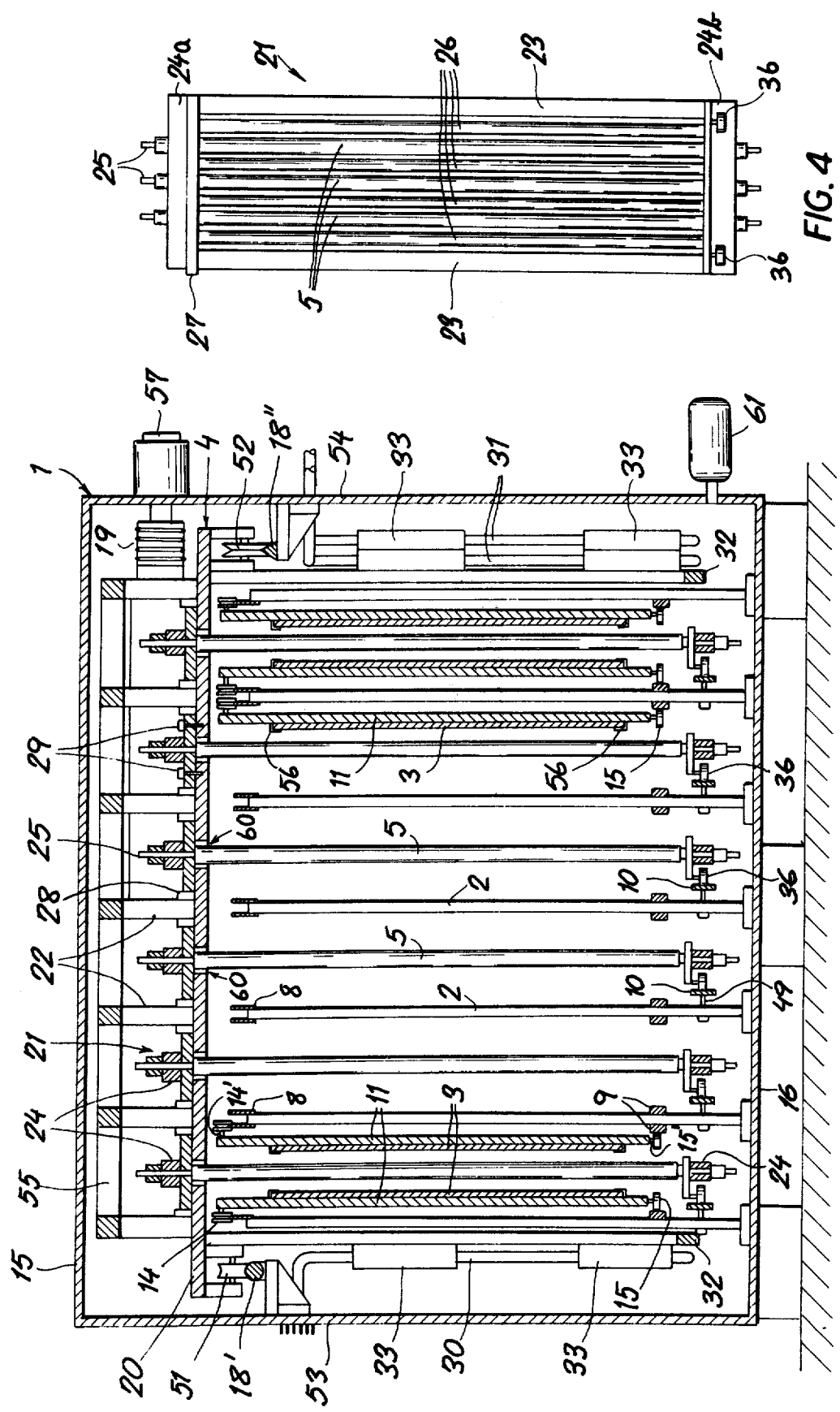

SPUTTER-COATING APPARATUS

FIELD OF THE INVENTION

The present invention relates to an apparatus for the sputter-coating of a sheetlike workpiece and, more particularly to an apparatus for use in the sputter-coating of a glass, ceramic, or synthetic-resin plate.

BACKGROUND OF THE INVENTION

One of the most troublesome aspects of the known sputter-coating devices is the accurate alignment of the electrodes and the workpieces. It is necessary to hold the workpieces in a predetermined position while displacing the electrodes past it at a spacing which remains uniform for the entire travel of the electrode past the workpiece. A common problem is caused by vibration of the workpiece and electrode, which vibration is caused by the travel of the electrode supporting carriage. Also the considerable heat generated in the treatment chamber as well as the energy of the discharges often causes displacement of the workpieces and/or electrodes.

OBJECTS OF THE INVENTION

It is an object of the present invention to provide an improved apparatus for sputter-coating a sheetlike workpiece.

Another object is the provision of an apparatus for the purposes described wherein uniform coating results can be obtained and loading and unloading time is reduced.

Yet another object is the provision of a sputter-coating apparatus wherein adjustment of the workpiece-electrode gap is simple and rapid.

A further object is to provide an improved system for guiding the electrode racks and for supporting the workpieces.

SUMMARY OF THE INVENTION

The above objects are attained according to the present invention in an apparatus wherein the workpieces are held in place by upper and lower guides forming part of vertical supports standing on the bottom wall of the treatment chamber. The electrodes hang vertically from a carriage which is horizontally reciprocal in the upper region of the treatment chamber, and the lower end of the electrode rack is guided by a guide rail below the lower rail on the support.

According to another feature of the present invention the carriage for the electrodes rides on a pair of rails in the upper region of the treatment chamber. These rails are independent of the upper guide rails so that the carriage has no effect on these elements as it is reciprocated back and forth during the sputtering operations. Preferably the rails are located on opposite sides and outwardly of the array of supports.

The workpieces (the bodies to be coated clipped to rigid support plates or frames) can be slipped in the end of the apparatus horizontally. The various guide rails can be shifted transversely for any desired spacing of the workpieces from the electrodes.

According to a further feature of this invention the electrodes are arrayed in a plurality of racks which are straight for planar workpieces or curved for warped or intentionally profiled workpieces. Each rack hangs through a respective slot formed in the carriage, and is blocked into an exact position in the slot. Similarly the lower end of each rack is provided with rollers rotatable about vertical axis and rising on the lower guide rail.

DESCRIPTION OF THE DRAWING

The above and other objects, features, and advantages of the invention will become more readily apparent from the following description, reference being made to the accompanying drawing in which:

FIG. 3 is a transverse section taken along line III — III of FIG. 2, the electrode racks being removed for simplification of the view;

FIG. 4 is a side elevational view of a rack of electrodes according to the present invention.

SPECIFIC DESCRIPTION

Figure 1:
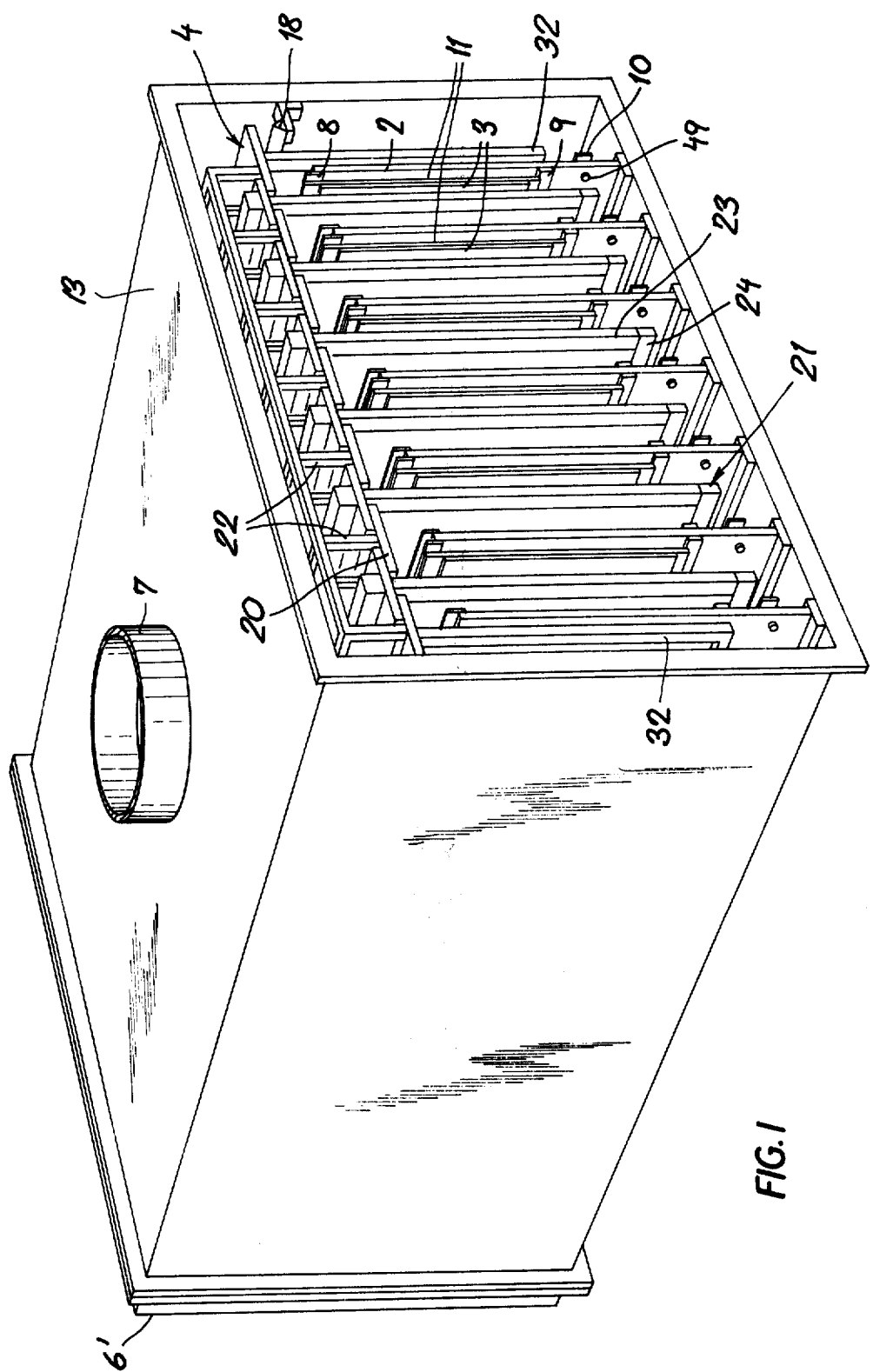
FIG. 1 is a perspective view of an apparatus according to this invention.
Figure 2:
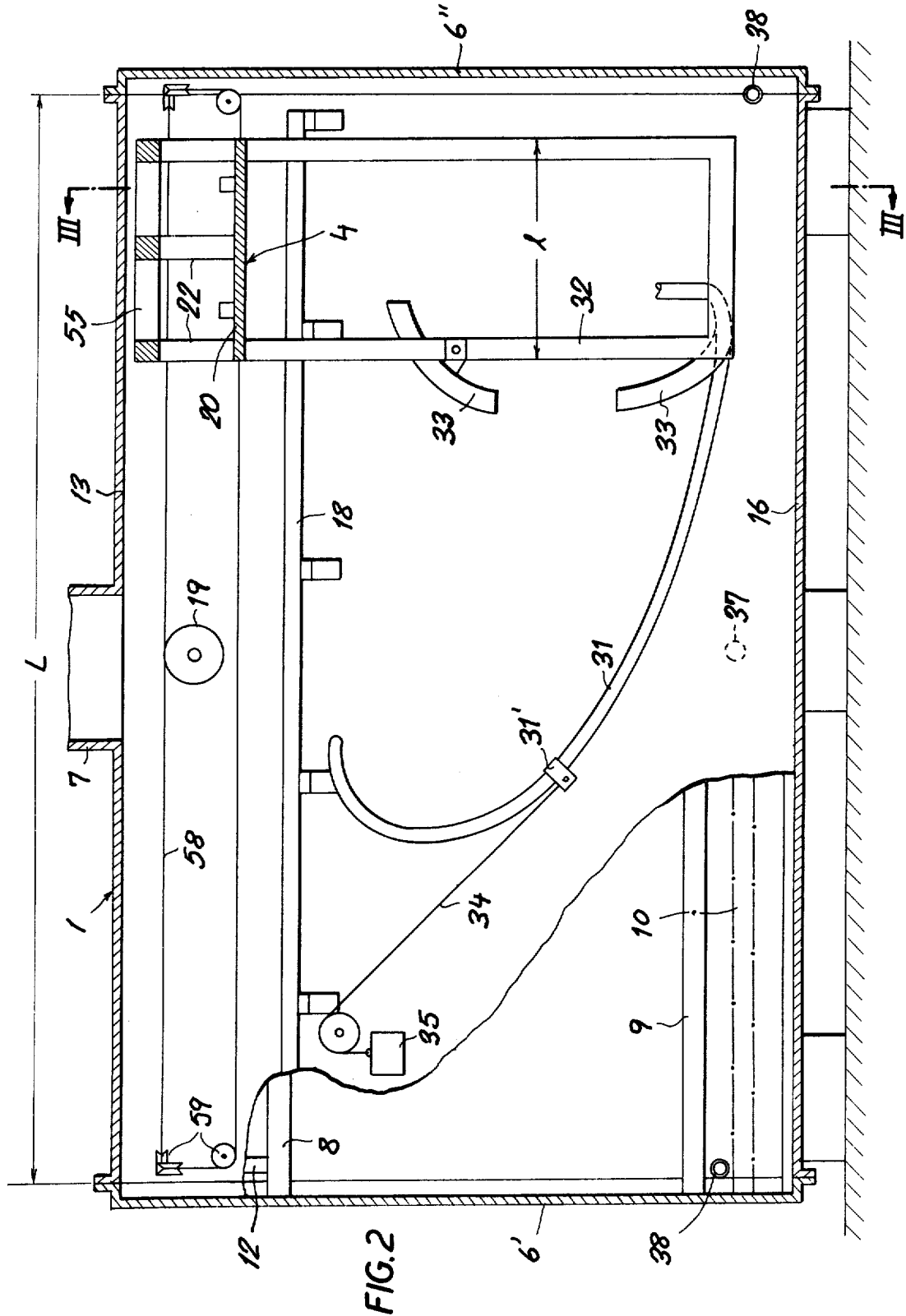
FIG. 2 is a longitudinal section through the apparatus according to the present invention with one of the doors removed for clarity.

The sputter-coating apparatus according to the present invention has a housing 1 with a pair of removable end walls 6' and 6'' that form an elongated gastight chamber in this housing. Plates 3 to be coated are held by adjustable clips 56 on rigid supports 11 in a vertical position, and the chamber is evacuated by a pump 39 (FIG. 5) connected at its top wall 13 by means of a conduit 7.

Each support plate 11 is held on a rigid support 2 which has the form of a vertical plate secured to the bottom wall 16 of the housing 1. Each plate 2 has along its upper edge at least one horizontal rail 8 on which ride rollers 14 secured to horizontal rotation axles 14' on the workpiece holder 11. Other rollers 15 rotatable on the holder 11 about vertical axes 15' ride against a guide rail 9 adjacent the lower edge of the respective plate 2 so that the workpiece holder 11 hangs on the upper rail 8 and is guided by the lower rail 9. In addition each plate 2 is provided below the rail 9 with yet another guide rail 10 against which ride rollers 36 on an electrode arrangement described below. Screws 49 serve to space the lower rail 10 from the plate 2 at a distance determined by the workpiece thickness and electrode diameter. Hangers 12 may secure the rails 8 to the top wall 13 of chamber 1.

A carriage 4 rides by means of a wheel 51 and a circumferentially grooved wheel 52 on a round rail 18' supported on one side wall 53 of the housing 1 and on a sharp-edged rail 18'' secured to the other side wall 54 of the housing 1. This carriage comprises a heavy steel plate 20 suspended by stout support beams 22 from a grid 55. This grid has a length $l$ substantially one-fifth of the length L of the housing 1. A reversible motor 57 carries a cable drum 19 on which is wound a cable 58 that is spanned over pulleys 59 and connected to the plate 20 of the carriage 4. As the motor rotates in one direction the carriage 4 travels in one longitudinal direction and when the motor is reversed, by means of simple limit switches, the carriage returns.

The plate 20 is formed with a plurality of slots 60 in which hang a planar electrode racks 21 (FIG. 4) each comprising three live cathodes 5 connected by means of end contacts 25 and cables 30 to a three-phase alternating-current source and hanging vertically. Four grounded electrodes 26 are interleaved with the electrodes to form a comb, and all of the electrodes 5 and 26 are cylindrical sleeves through which water is ciruclated from a cooler by a pump through flexible conduits 31. These electrodes are arrayed parallel to each other in an upright position in a rectangular frame formed by horizontal crosspieces 24a and 24b interconnected by side members 23. The lower crosspiece 24b is provided with the four small horizontal rollers 36 which engage the guides 10 so that the electrode assembly 21 does not wobble from side to side as it is displaced by the carriage 4 through the chamber 1. The upper crosspiece 24a is provided with two outwardly projecting flanges 27 which lie on top of the confronting edges of a slot 60. Spacer blocks 28 are employed to insure an exact positioning of the upper portion of each rack 21 relative to the respective slot 60. Screws 29 may be used to secure the flanges 27 to the plate 20.

In order to prevent the flexible conduits 31 and cable 30 from kinking and interfering with operation of the device a counterweight 35 suspended on a cable 34 from a pulley is provided, with the cable 34 attached by means of a bracket 35 to the center of the respective conduit or cable. In addition depending side members 32 are provided on the carriage 4 with guide shields 33 which will prevent such kinking or interference.

It should also be noted that when an undulating or otherwise nonplanar workpiece is to be coated similarly curved electrodes may be employed, and the workpiece sheets can be received directly between the guides without a support frame.

A process gas such as argon is fed from a source 61 through conduits 37 into perforated distributing pipes 38 which extend across the full width of the chamber 1 at its top and bottom adjacent the doors 6' and 6''.

Figure 5:
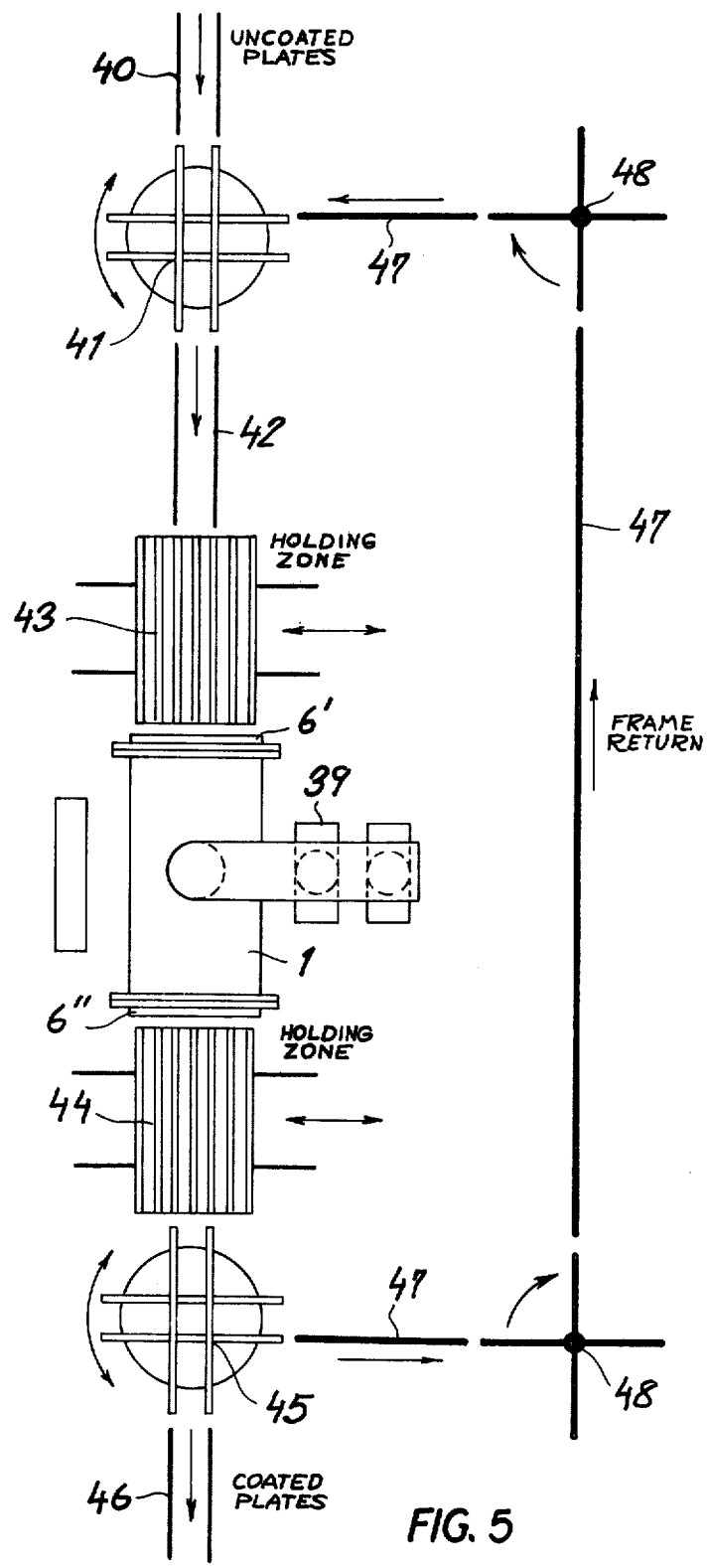
FIG. 5 is a top view schematically showing how the apparatus is loaded and unloaded.

The apparatus is operated as follows:

As shown in FIG. 5 a plurality of uncoated sheets 3 of glass are fed into the device one after the other over a path 40 and onto a turntable 41 where each sheet 3 is secured to a respective plate 11. The loaded plates are thereafter passed along a path 42 one by one and loaded next to each other into a transversely displaceable holding rack 43. The doors 6' and 6'' of the housing 1 are then opened and all the workpieces 3 with their carrying plates 11 are pushed in the door 6' and all the coated workpieces and their plates 11 are pushed out the door 6'' and onto a holding rack 44. The freshly removed plates 11 are then unloaded, one by one, onto a turntable 45 whence the coated workpieces 3 exit over a path 46 and the empty holding plates 11 are returned via a conveyor 47 having other turntables 48 at its corners to the turntable 41. The displacements of the racks 43 and 44 are sequenced in such a manner that the same plate always is returned to the same position in each rack, and the conveyor 47 and turntables 48 similarly operated to insure that the same end of each plate 11 is always oriented in the same direction so that each plate is always replaced in the housing 1 in the same position and with the same orientation.

For plating the sheets, the suction pump 39 is actuated and once pressure in the chamber 1 has dropped below a predetermined level argon is admitted from the perforated pipes 38 to fill the chamber. Then the electrodes are energized and coolant is circulated through them. With the carriage 4 in the antechamber adjacent door 6'', an arc is drawn between the electrodes. Then the motor 57 is started to draw the carriage along the workpieces and sputter coat that face of each workpiece turned toward the cathodes 5. Cathodes of different metals are used to obtain multilayer coating.

Since the electrode racks 21 are guided both at their tops and at their bottoms the spacing between the electrodes 5 and the workpieces 3 remains almost perfectly uniform as these racks are displaced through the chamber. Proper adjustment by use of the blocks 27 and the screws 49 allows any irregularity to be canceled out with little difficulty.

We claim:

1. A sputter-coating apparatus comprising:
a gastight chamber having a bottom wall;
suction means connected to said chamber for at least partially evacuating same;
an upright workpiece support in said chamber including at least one upper horizontal rail, at least one lower horizontal rail below and parallel to said upper rail and secured to said bottom wall, and a plate suspended rollingly on said upper rail and bearing laterally on said lower rail, a sheet-like workpiece being retainable in an upright position on said plate between said upper rail and said lower rail;
a horizontal guide on said support below said lower rail;
a horizontally displaceable carriage in said chamber above said upper rail;
a rack of sputter-coating electrodes having an upper end attached to said carriage and a lower end engaged with said guide; and
means for displacing said carriage horizontally in said chamber with said lower end riding along said guide and thereby moving said electrodes past said sheet-like workpiece while sputtering a coating thereon, said electrode rack including a plurality of elongated vertical electrodes and upper and lower cross members interconnecting said electrodes at said upper and lower ends of said rack, said lower cross members being provided with a plurality of laterally projecting rollers rotatable about vertical axes and engaging said guide beneath said plate.

2. The apparatus defined in claim 1 wherein said housing has a pair of removable end walls, said apparatus further comprising means for feeding a process gas to the interior of said chamber.

3. The apparatus defined in claim 2 wherein said means for feeding includes at least one manifold pipe arranged adjacent said bottom wall inside said chamber.

4. The apparatus defined in claim 1, further comprising means for adjustably positioning said guide independently of the lower rail relative to said support.

* * * * *